(12) United States Patent
Markel et al.

(10) Patent No.: US 9,346,380 B2
(45) Date of Patent: May 24, 2016

(54) VEHICLE SEAT, IN PARTICULAR MOTOR VEHICLE SEAT

(75) Inventors: Christian Markel, Alzey (DE); Thomas Dill, Heiligenmoschel (DE); Wolfgang Pluta, Imsweiler (DE); Viktor Enns, Kaiserslautern (DE); Gerhard Mueller, Kaiserslautern (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 213 days.

(21) Appl. No.: 14/119,783

(22) PCT Filed: Apr. 26, 2012

(86) PCT No.: PCT/EP2012/057633
§ 371 (c)(1),
(2), (4) Date: Jan. 18, 2014

(87) PCT Pub. No.: WO2012/159846
PCT Pub. Date: Nov. 29, 2012

(65) Prior Publication Data
US 2014/0183912 A1 Jul. 3, 2014

(30) Foreign Application Priority Data

May 24, 2011 (DE) .......................... 10 2011 102 420

(51) Int. Cl.
*B60N 2/427* (2006.01)
*B60N 2/22* (2006.01)
(Continued)

(52) U.S. Cl.
CPC .............. *B60N 2/42709* (2013.01); *B60N 2/22* (2013.01); *B60N 2/4214* (2013.01); *B60N 2/682* (2013.01)

(58) Field of Classification Search
CPC .................................................. B60N 2/42709
USPC .............................. 297/216.1, 216.13, 216.14
See application file for complete search history.

(56) References Cited

U.S. PATENT DOCUMENTS

| 4,786,110 A | 11/1988 | Mahling et al. |
| 5,507,553 A | 4/1996 | Nishizawa et al. |

(Continued)

FOREIGN PATENT DOCUMENTS

| CN | 1919103 A | 2/2007 |
| CN | 101636293 A | 1/2010 |

(Continued)

OTHER PUBLICATIONS

International Search Report mailed Jul. 17. 2012, as received in corresponding International Patent Application No. PCT/EP2012/057633.

(Continued)

*Primary Examiner* — Peter Brown
*Assistant Examiner* — Jody Giacoman
(74) *Attorney, Agent, or Firm* — Foley & Lardner LLP

(57) ABSTRACT

A vehicle seat, has a seat part, a backrest, and at least one fitting, by which the back rest is attached pivotably to the seat part. The fitting has a first fitting part connected to the backrest and a second fitting part connected to the seat part. The fittings are normally located in the force flux between the backrest and seat part. The seat has at least one deformation zone which is deformed in the event of a crash. A supporting element is mounted on the backrest and a supporting element is mounted on the seat part, the supporting elements normally being spaced apart from each other and, in the event of a crash, coming into contact with each other because of the deformation of the deformation zone to provide a further force flux path lying parallel to the fitting.

10 Claims, 3 Drawing Sheets

(51) Int. Cl.
　　　*B60N 2/42*　　　(2006.01)
　　　*B60N 2/68*　　　(2006.01)

(56) References Cited

U.S. PATENT DOCUMENTS

| | | | |
|---|---|---|---|
| 6,786,543 | B2 | 9/2004 | Andersson et al. |
| 7,513,572 | B2 * | 4/2009 | Kawashima .................. 297/362 |
| 8,550,563 | B2 * | 10/2013 | Nasshan et al. .......... 297/452.18 |
| 9,096,152 | B2 * | 8/2015 | Zynda et al. |
| 2006/0084547 | A1 * | 4/2006 | Dill et al. ...................... 475/162 |
| 2007/0046090 | A1 | 3/2007 | Yamada et al. |
| 2008/0169695 | A1 * | 7/2008 | Hahn et al. .................... 297/367 |
| 2010/0117429 | A1 * | 5/2010 | Mitsuhashi .............. 297/354.12 |
| 2010/0171351 | A1 * | 7/2010 | Thiel et al. ................... 297/341 |

FOREIGN PATENT DOCUMENTS

| | | |
|---|---|---|
| CN | 101992702 A | 3/2011 |
| CN | 102026844 A | 4/2011 |
| DE | 198 07 581 A1 | 9/1998 |
| DE | 20 2009 016 989 U1 | 4/2010 |
| DE | 20 2009 017 811 U1 | 7/2010 |
| EP | 2 123 506 A1 | 11/2009 |
| KR | 100601808 B1 | 7/2006 |
| WO | WO-2007/026571 A1 | 3/2007 |

OTHER PUBLICATIONS

Official Action dated Apr. 30, 2012, as received in corresponding German Patent Application No. 10 2011 102 420.8.
First Office Action and Search Report issued in co-pending Chinese Application No. 201280015378.8 mailed Mar. 27, 2015.
First Office Action dated Dec. 22, 2014, received in corresponding European Application No. 12717281.5, 5 pages.
Office Action dated Aug. 12, 2014, in corresponding Japanese Patent Application No. 2014-500427 along with English translation, 4 pages.

* cited by examiner

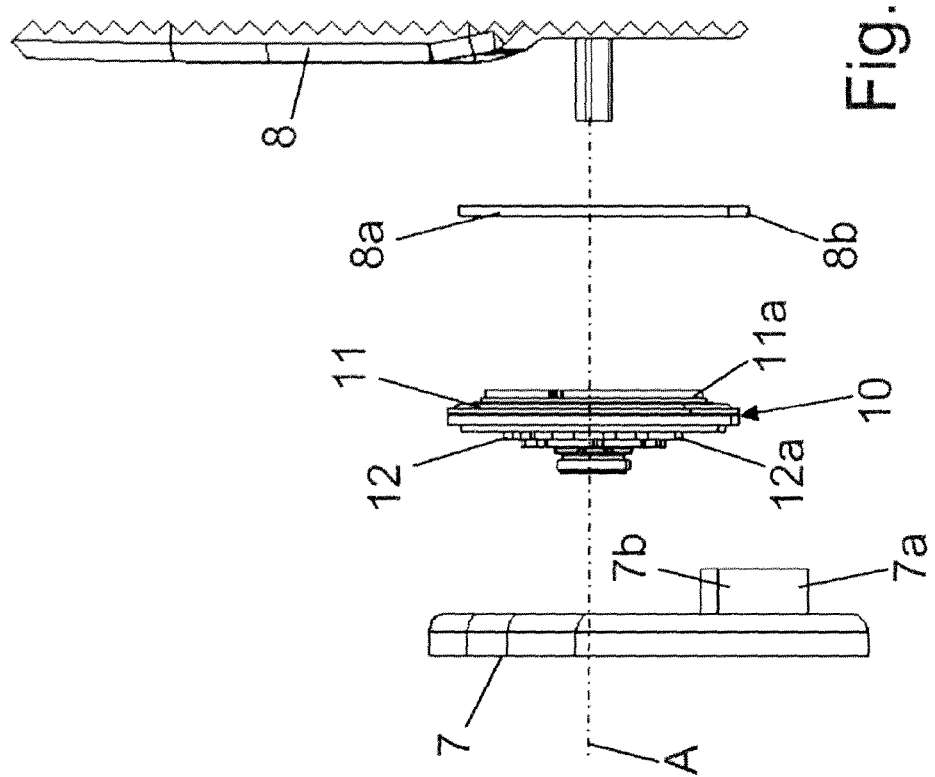

VEHICLE SEAT, IN PARTICULAR MOTOR VEHICLE SEAT

CROSS REFERENCE TO RELATED APPLICATIONS

The present application is a U.S. National Stage of international Application No. PCT/EP2012/057633, filed on Apr. 26, 2012, which claims the benefit of German Patent Application No. 10 2011 102 420.8, filed on May 24, 2011, the entire disclosures of all of which are incorporated herein by reference.

The invention relates to a vehicle seat, in particular a motor vehicle seat, having the features of the preamble of claim 1.

A vehicle seat of the type mentioned in the introduction is known from DE 198 07 581 A1. The fitting is secured by the first fitting member to the backrest and connected two-fold to the seat member with the second fitting member, that is to say, on the one hand, by means of a rotary bearing and, on the other hand, by means of a deformation element which defines the deformation zone and which is located parallel with the rotary bearing with respect to the force path between the backrest and seat member but in series with the fitting. In the event of a crash, the torque applied to the backrest brings about a rotation of the second fitting member about the rotary bearing, with simultaneous deformation of the deformation element for energy dissipation.

An object of the invention is to provide an alternative vehicle seat of the type mentioned in the introduction. This object is achieved according to the invention by a vehicle seat having the features of claim 1. The dependent claims relate to advantageous embodiments.

Using the support elements, in the event of a crash a path which is parallel with the fitting is provided for the force path, which relieves the fitting. When the same fitting is used, the threshold value of the loading can thereby be increased, that is to say, the carrying structure can thereby absorb higher loads. If different load classes of fittings are available, with the same load threshold value, that is to say, with the same level of safety, a fitting of a lower load class can alternatively be used. The support elements may be provided at a vehicle seat side, which is advantageous, for example, with integrated belt seats, or on both vehicle seats, preferably with mirror-symmetrical construction. In contrast to many known crash locking members for belt locks, the crash force does not initiate the formation of the parallel path for the force path in the safety belt, but instead the deformation of the deformation zone does.

The invention is explained in greater detail below with reference to an embodiment illustrated in the drawings.

In the drawings:

FIG. 5 is an exploded view corresponding to FIG. 1.

Figure 2:
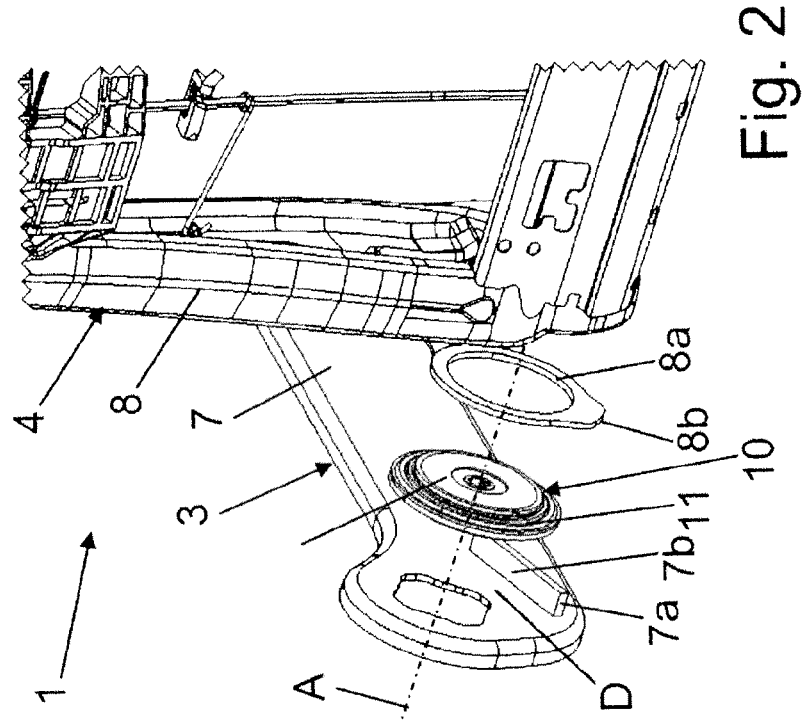
FIG. 2 is a perspective exploded view corresponding to FIG. 1.
Figure 1:
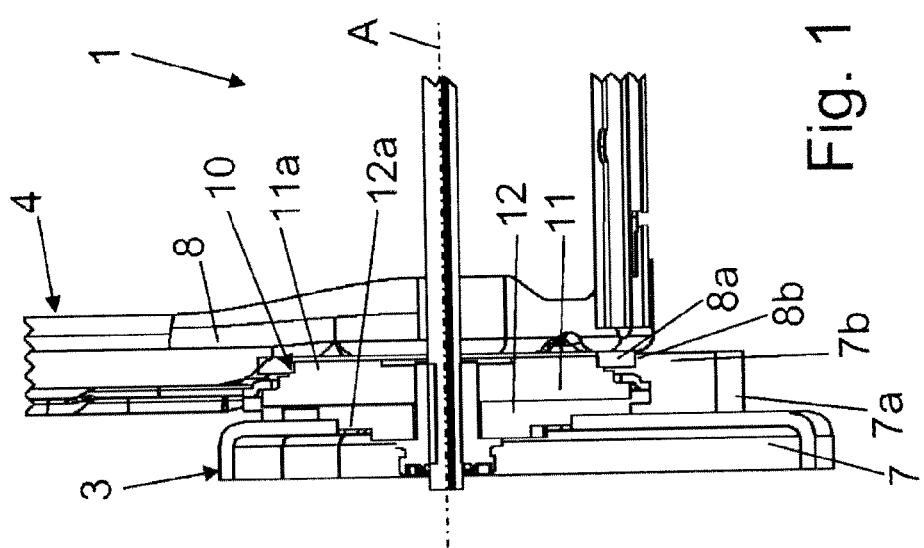
FIG. 1 is a cross-section through a portion of the embodiment.
Figure 4:
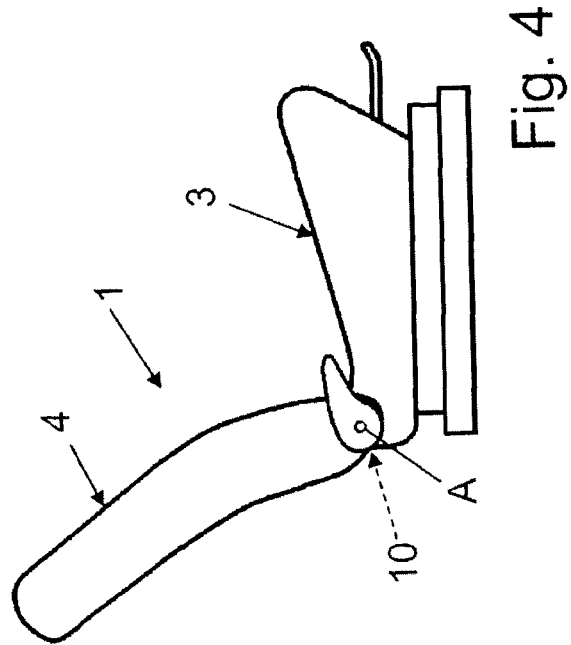
FIG. 4 is a schematic illustration of the embodiment.
Figure 3:
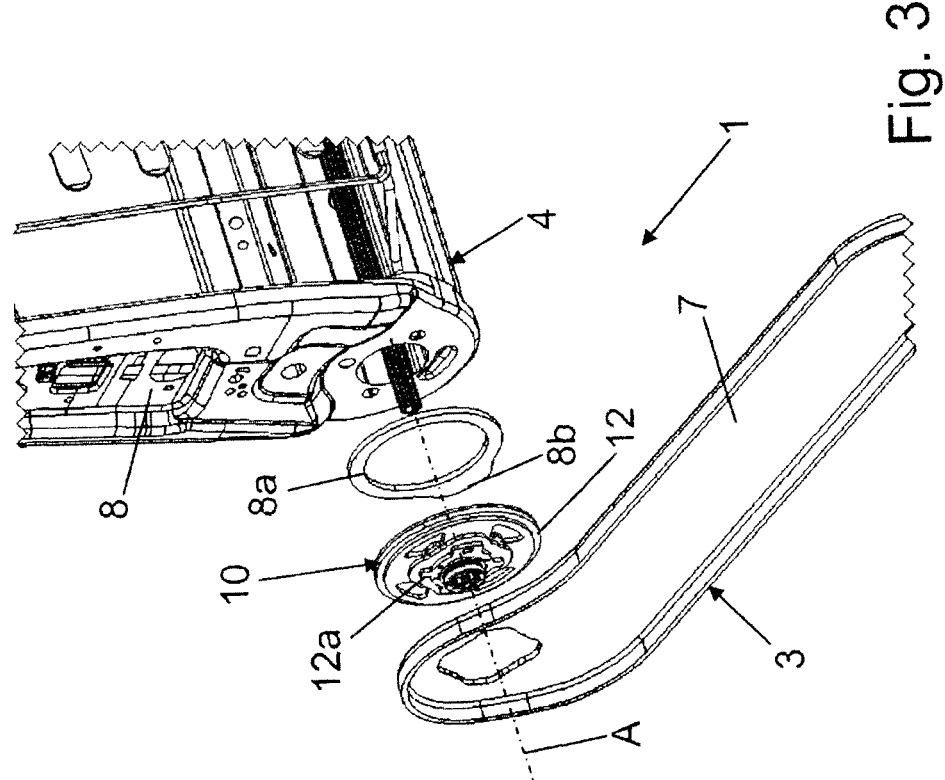
FIG. 3 is an exploded view corresponding to FIG. 2, at the other vehicle seat side which is constructed in a mirror-symmetrical manner.

A vehicle seat 1 for a motor vehicle has a seat member 3 and a backrest 4. The arrangement of the vehicle seat within the motor vehicle and the usual travel direction thereof define the directional indications used below. At both vehicle seat sides, the vehicle seat 1 has, as part of the carrying structure of the seat member 3, a seat frame lateral portion 7 and, as part of the carrying structure of the backrest 4, a backrest strut 8, which are each connected by means of additional structural components to the corresponding portions at the opposing vehicle seat side. The vehicle seat 1 also has at both sides fittings 10, by means of which the backrest 4 is fitted to the seat member 3 and can be pivoted relative thereto. In this instance, at each vehicle seat side, the fitting 10 is secured, on the one hand, to the associated seat frame portion 7 and, on the other hand, to the backrest strut 8.

The fitting 10 has a first fitting member 11 and a second fitting member 12 which can be rotated relative to each other. In this instance, the fitting 10 is constructed as a catch fitting, as described, for example, in DE 20 2009 016 989 U1, the disclosure of which in this regard is expressly incorporated herein by reference. With such a fitting 10, the two fitting members 11 and 12 can be locked together. However, it is also possible to use a gear fitting as a fitting 10, as described, for example (with a self-limiting eccentric planet gear) in DE 20 2009 017 811 U1, the disclosure of which in this regard is also expressly incorporated herein by reference. Such a fitting 10 is driven in order to rotate the fitting members 11 and 12 relative to each other and blocks the latter when it is not driven.

The first fitting member 11 is securely connected to the backrest strut 8, that is to say, secured to the backrest. The backrest strut 8 has in the region of the securing of the first fitting member 11 a support element 8a which is secured to the backrest and which in this case is a component which is constructed separately from the backrest strut 8 and secured to the backrest strut 8, but which may alternatively also be formed on the backrest 8, that is to say, may be constructed integrally therewith. The support element 8a which is secured to the backrest is in this instance constructed as a ring which rests (preferably in a positive-locking manner) on an annular shoulder 11a of the first fitting member 11, and which has, at a location of the periphery thereof a radially protruding first support contour 8b in the form of a cam. The support element 8a which is secured to the backrest is in this instance welded to the backrest strut 8 together with the first fitting member 11. However, other securing techniques and/or separate securing of the two components 8a, 11 to the backrest strut 8 are also possible. Axial projections which are on the support element 8a secured to the backrest and which cooperate in a positive-locking manner with corresponding openings in the backrest strut 8 allow propositioning before welding.

The second fitting member 12 is securely connected to the seat frame lateral portion 7, that is to say, secured to the seat member. In this instance, the second fitting member 12 has for this purpose a star-like shoulder 12a which engages in a positive-locking manner in a corresponding opening of the seat frame lateral portion 7 and is welded thereto. The seat frame lateral portion 7 has, in the region of the securing of the second fitting member 12, a support element 7a which is secured to the seat member and which in this instance is a component constructed separately (from the seat frame lateral portion 7) and which is secured to the seat frame lateral portion 7, but which may also alternatively be formed on the seat frame lateral portion 7, that is to say, may be constructed integrally therewith. The support element 7a which is secured to the seat member is in this instance constructed as an angular profile which is welded to the seat frame lateral portion with the downwardly directed member thereof at an angle of approximately 23° relative to the horizontal and which has on the other member thereof at the upper side thereof a second support contour 7b in the form of a ramp. However, other securing techniques are also possible. Between the support element 7a which is secured to the seat member and the opening for the star-like shoulder 12a (and consequently the second fitting member 12), the seat frame lateral portion 7 has a deformation zone D. The deformation zone D is intended to be able to deform in the event of a crash, such a deformation being able to be carried out in a selective manner by means of material recesses or material weakenings in the deformation zone D.

Under normal circumstances, the two support contours 7b and 8b are spaced apart from each other, regardless of whether the fitting 10 is locked (or is not driven) or whether the fitting 10 is unlocked (or is driven), in order to adjust the inclination of the backrest 4. The backrest 4 carries out, relative to the seat member 3, a pivot movement about an axis A which, in the case of a fitting 10 having an eccentric planet gear, wobbles in space but is otherwise fixed in position. It may therefore be advantageous for the two support contours 7b and 8b to be curved about the fixed axis A so that the spacing thereof is independent of the inclination of the backrest 4. In the locked (or non-driven) state, the fittings 10 are located exclusively in the force path between the backrest 4 and seat member 3, that is to say, all the forces applied to the backrest 4 (for example, gravitational force) are directed into the seat member 3 exclusively by means of the fittings 10.

In the event of a crash, the backrest 4 is subjected to loading, in particular a torque relative to the seat member 3, in the event of a front-end crash in a forward direction and in the event of a rear-end crash in a backward direction. In order to reduce the loading of the fitting 10, there is provided according to the invention a division of the force path, with the fitting 10 being bridged relative to the force path. To this end, a desired deformation of the seat frame lateral portion 7 (and/or the backrest strut 8), in particular the deformation zone D located in the vicinity of the fitting 10 is used. The deformation of the deformation zone D brings about a dissipation of energy. Owing to the deformation of the deformation zone D, the two support elements 7a and 8a also move into abutment with each other with the support contours 7b and 8b thereof and thus provide another path for the force path, which is located parallel (in the technical connection sense) with the fitting 10 and consequently bridges it. The torques on the fitting 10 about all three spatial directions can thus be reduced. In this instance, a reduction of the loading of the fitting 10 by approximately from 10 to 20% is achieved. The arrangement of the deformation zone D and the two support elements 7a and 8a with the support contours 7b and 8b thereof is adapted to the anticipated deformation of the deformation zone D owing to the most probable load. If a front-end crash and a rear-end crash are intended to be covered, two first support contours 8b and two second support contours 7b may be provided on a common support element 8a or 7a, respectively, or each on their own support element 8a or 7a, respectively. A plurality of deformation zones D may also be provided in the region of the seat frame lateral portion 7 and/or the backrest strut 8.

LIST OF REFERENCE NUMERALS

1 Vehicle seat
3 Seat member
4 Backrest
7 Seat frame lateral portion
7a Support element secured to the seat member
7b Second support contour
8 Backrest strut
8a Support element secured to the backrest
8b First support contour
10 Fitting
11 First fitting member
11a Annular shoulder
12 Second fitting member
12a Star-like shoulder
A Axis
D Deformation zone

The invention claimed is:

1. A vehicle seat, comprising:
a seat member;
a backrest;
at least one fitting by which the backrest is pivotably fitted to the seat member, wherein the fitting has a first fitting member which is connected to the backrest and a second fitting member which is connected to the seat member,
wherein the fitting members are positioned between the backrest and the seat member such that, under normal circumstances, force applied to the backrest is transferred to the seat member only through the fitting along a first force path, wherein the first force path extends through the fitting; and
at least one deformation zone on the seat member, wherein the at least one deformation zone is configured to deform in the event of a crash,
wherein the backrest has a backrest support element secured to a portion of the backrest and the seat member has a seat member support element secured to a portion of the seat member,
wherein, under the normal circumstances, the support elements are spaced apart from each other,
wherein, in the event of a crash, the deformation zone deforms such that the support elements abut each other such that force applied to the backrest is transferred to the seat member through the support elements along a second force path, wherein the second force path extends through the support elements and is parallel with the fitting.

2. The vehicle seat as claimed in claim 1, wherein the backrest has a carrying structure with at least one backrest strut on which the backrest support element is provided.

3. The vehicle seat as claimed in claim 2, wherein the backrest support element is formed on the backrest strut.

4. The vehicle seat as claimed in claim 1, wherein the seat member has a carrying structure with at least one seat frame lateral portion on which the seat member support element is provided.

5. The vehicle seat as claimed in claim 4, wherein the seat member support element is formed on the seat frame lateral portion.

6. The vehicle seat as claimed in claim 1, wherein the deformation zone is formed on the seat member between an opening on the seat member for engagement with a portion of the second fitting member and the seat member support element.

7. The vehicle seat as claimed in claim 1, wherein the backrest support element is secured to the first fitting member.

8. The vehicle seat as claimed in claim 1, wherein the two fitting members can be rotated relative to each other about an axis.

9. The vehicle seat as claimed in claim 8, wherein at least one of the support elements is curved about the axis.

10. The vehicle seat as claimed in claim 1, wherein at least one of the support elements is formed as a ramp.

* * * * *